Figure 1:
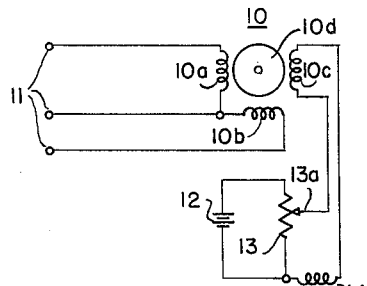

Feb. 19, 1952     H. C. ROTERS     2,586,095
SYSTEM FOR AND METHOD OF CONTROLLING HYSTERESIS MOTORS
Filed April 25, 1949

*INVENTOR.*
HERBERT C. ROTERS
BY
ATTORNEY

Patented Feb. 19, 1952

2,586,095

UNITED STATES PATENT OFFICE 2,586,095

SYSTEM FOR AND METHOD OF CONTROLLING HYSTERESIS MOTORS

Herbert C. Roters, Kew Gardens, N. Y., assignor to Fairchild Camera and Instrument Corporation, a corporation of Delaware Application April 25, 1949, Serial No. 89,408

2 Claims. (Cl. 318—166)

This invention relates to a system for and method of controlling hysteresis motors and, more particularly, to such a system and method for controlling and regulating the speed of such motors either during normal sub-synchronous operation or by braking upon de-energization.

Hysteresis motors have found rather widespread use in fractional horsepower and micropower sizes, particularly where synchronous operation is desired, since they constitute one of the most economical forms of low-power synchronous motors. Such motors have also found wide application in the control field because of their uniform sensitivity to control excitation in all angular positions.

It is well known that hysteresis motors, if not overloaded, are inherently synchronous in operation and, while such characteristic is usually used to advantage, it frequently becomes desirable to be able to control the speed of the motor, which implies a reduction of the motor speed below synchronism since super-synchronous speeds are not readily attainable. For example, in certain applications it is desirable rapidly to reduce the speed of such a motor to zero upon de-energization, that is, to brake the motor rapidly and uniformly to a standstill. Further, there are certain applications where hysteresis motors may be used to advantage, in which it is also desirable continuously to regulate or control the speed of the motor during normal operation at sub-synchronous speeds.

It is an object of the present invention, therefore, to provide a new and improved system for and method of controlling hysteresis motors by means of which the speed of the motor may be readily and uniformly reduced to zero for braking purposes.

It is another object of the invention to provide a new and improved system for and method of controlling hysteresis motors by means of which the speed of the motor may be continuously regulated or controlled at sub-synchronous speeds.

In accordance with the invention, there is provided a motor control system comprising a synchronous hysteresis motor having a plurality of phase windings and a hysteresis rotor, a circuit for normally exciting the windings to develop a rotating magnetic field, and a control circuit for applying to at least one of the phase windings a current effective to develop a sub-synchronous magnetic field of a value to reduce the speed of the motor below synchronism. The motor control system also comprises impedance means for substantially suppressing the flow of current in each of the circuits of the frequency of the other of the circuits.

For a better understanding of the present invention, together with other and further objects thereof, reference is had to the following description taken in connection with the accompanying drawings, and its scope will be pointed out in the appended claims.

Figure 2:
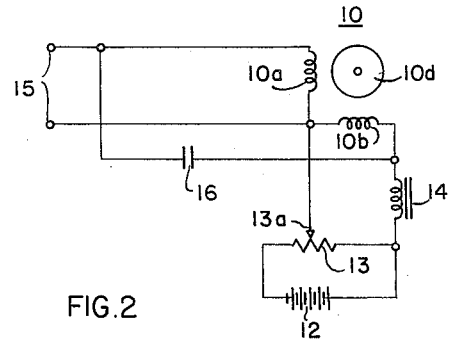
Figure 3:
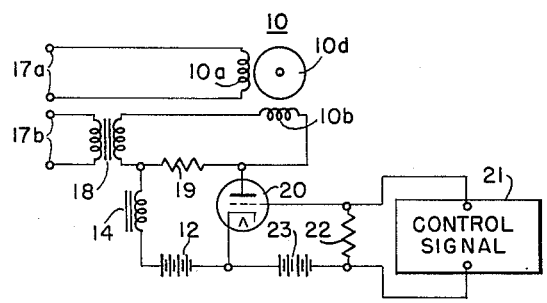
Figure 4:
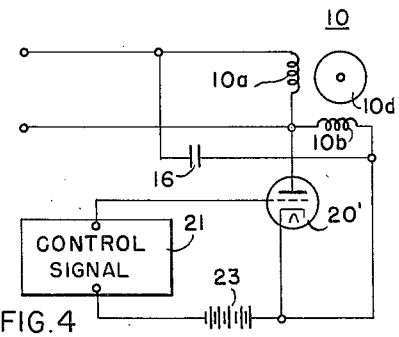
Figure 5:
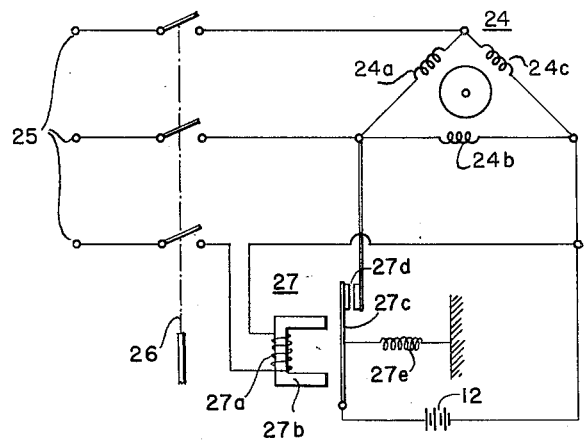

Referring now to the drawings, Fig. 1 is a schematic circuit diagram of a system for regulating or controlling the speed of a two-phase hysteresis synchronous motor; Fig. 2 is a schematic circuit diagram of a modification of the system of Fig. 1 embodying a split-phase single-phase motor which avoids the use of an auxiliary control winding; Fig. 3 is a schematic circuit diagram of a further modification of the system of Fig. 1 in which the speed of the hysteresis synchronous motor is automatically controlled in response to a control signal; Fig. 4 is a schematic circuit diagram of a simplified form of the system of Fig. 3; while Fig. 5 is a schematic circuit diagram of a system embodying a three-phase hysteresis synchronous motor and including an arrangement for automatically reducing the speed of the motor to zero in response to de-energization of the motor.

Referring now specifically to Fig. 1 of the drawings, there is represented a motor control system comprising a synchronous hysteresis motor 10 having a winding system including a pair of phase windings 10a and 10b and an auxiliary winding 10c. The motor further includes a rotor 10d of a material having a high hysteretic constant, such as a chrome steel or an aluminum-nickel-cobalt alloy of the type commercially available as "Alnico." The system also includes a circuit for normally exciting the phase windings 10a, 10b of the motor to develop a rotating magnetic field; specifically, the windings 10a and 10b may be conventional two-phase distributed windings connected to two-phase supply terminals 11.

The system of Fig. 1 also includes means for applying to the motor 10 an auxiliary sub-synchronous magnetic field to reduce the speed of the motor below synchronism. Specifically, this means may comprise means for applying to at least a portion of the winding system, for example, the auxiliary winding 10c, a controllable unidirectional current effective to develop a stationary magnetic field to control the speed of the motor. It will be understood that the winding 10c may be disposed in the same stator slots as the windings 10a and 10b and may be arranged to provide any desired number of pole pairs. The system also includes means for varying the auxiliary winding current to control the speed of the motor. This means may comprise any source of direct current, such as a battery 12, and a voltage-divider resistor 13 connected thereacross and having an adjustable contact 13a. The winding 10c is connected across an adjustable portion of the voltage divider 13 through a choke coil 14 to suppress the flow of alternating currents induced in the winding 10c.

It is believed that the operation of the system of Fig. 1 will be apparent to those skilled in the art from the foregoing description. In brief, a periodic or alternating polyphase current is applied to the phase windings 10a, 10b of the motor from the supply terminals 11, which is effective to develop a rotating magnetic field in the motor causing it normally to run at synchronous speed. At the same time, an auxiliary unidirectional control current is applied to the auxiliary winding 10c from the voltage divider 13 to control the speed of the motor. This auxiliary control current is effective to develop a sub-synchronous, specifically a stationary, magnetic field across the motor which reacts upon the hysteresis rotor 10d to load or brake the same. The unidirectional current may be adjusted by adjustment of the contact 13a to such a value as to reduce the speed of the motor below synchronism but not to brake it to a stop. Under these conditions, adjustment of the control current by adjustment of the contact 13a is effective to control or regulate the speed of the motor over a desired range of sub-synchronous speeds. On the other hand, if desired, the control current in the auxiliary winding 10c may be adjusted to a value sufficient to reduce the speed of the motor rapidly to some predetermined sub-synchronous speed, for example, rapidly to brake the motor to a stop.

Thus, the motor control system of Fig. 1 provides a motor drive having the advantages of synchronous operation where desired and, in addition thereto, operation over a range of sub-synchronous speeds which may be readily controlled merely by adjustment of the contact 13a. Further, if desired, the contact 13a may be adjusted rapidly to a point on the voltage divider 13 such that the value of the auxiliary current in the winding 10c produces a powerful stationary magnetic field effective to brake the motor rapidly to a stop. Such braking action may be effected with or without power applied to the motor windings 10a, 10b, depending on the motor characteristics and the particular application involved.

Fig. 2 represents a modified form of the motor control system of the invention, in which the auxiliary winding 10c is omitted and the winding system of the motor 10 comprises only the pair of two-phase windings 10a, 10b. The windings 10a and 10b are energized from the single-phase supply circuit terminals 15, the winding 10a being connected directly to the terminals 15 and the winding 10b being connected thereto through a phase-splitting condenser 16 for normally exciting the windings 10a, 10b in quadrature.

In the system of Fig. 2, the control circuit for developing the sub-synchronous auxiliary magnetic field is connected to apply to one portion of the winding system, specifically, to the phase winding 10b, a unidirectional current effective to develop the desired stationary magnetic field. As in the system of Fig. 1, the winding 10b is connected to be excited from a control circuit including a unidirectional source, such as a battery 12, and the voltage-divider resistor 13 having an adjustable contact 13a. The system of Fig. 2 includes impedance means for substantially suppressing the flow of current in each of the supply circuits and the control circuit of the frequency of the other of said circuits. Specifically, the choke 14 suppresses the flow of alternating current from the supply terminals 15 through the control circuit including voltage divider 13 and source 12, while the phase-splitting condenser 16 also suppresses the flow of unidirectional current from the battery 12 through the other phase winding 10a and the supply circuit 15. The system of Fig. 2 is thus a simplification of that of Fig. 1, in which the auxiliary winding 10c of Fig. 1 may be omitted. However, the magnetic circuit including the winding 10b of Fig. 2 must be designed so that it does not become saturated by the combined exciting current and control current during normal operation. In other respects, the operation of the system of Fig. 2 is similar to that of Fig. 1. The value of the auxiliary unidirectional current through the winding 10b may be adjusted either for continuous regulation or control at sub-synchronous speeds or to brake the motor rapidly to a stop. The circuit arrangement of Fig. 2 may also be applied to a polyphase motor in which case the condenser 16 serves only as a direct-current blocking condenser and preferably has a value sufficiently large that it does not cause a substantial phase shift of the supply current.

In Fig. 3 there is represented a further modified motor control system embodying the invention, in which the control circuit for applying to a portion of the motor winding system a current effective to develop a sub-synchronous magnetic field is responsive to a variable source of control signal for varying the control current to control the speed of the motor. The motor 10 of Fig. 3 is represented as of the two-phase type having phase windings 10a, 10b electrically insulated from each other. The windings 10a and 10b are supplied from the four-phase supply terminals 17a, 17b, the latter being energized through an insulating transformer 18. In the case of a conventional three-wire two-phase supply circuit, the lower terminal 17a and the upper terminal 17b may be connected together. In this system, the auxiliary control current is applied to the phase winding 10b from a control circuit including a source, such as a battery 12, a choke 14 for suppressing the flow of alternating current, a resistor 19, and a vacuum tube 20 which, for simplification, is shown as a triode, but which may be any suitable type of repeater or amplifier having a unidirectional output. The grid of the tube 20 is excited from any suitable source of control signal 21 and is returned to its cathode through a grid leak 22 and a negative bias battery 23. It will be understood that the control signal developed by the unit 21 may be in response to variations of any controlling quantity, for example, temperature, pressure, speed, etc.

The operation of the system of Fig. 3 is in all respects similar to that of the systems of Figs. 1 and 2. Variations in the control signal 21 control the repeater tube 20 to vary the unidirectional control current applied to the winding 10b which develops the auxiliary stationary magnetic field for control purposes. The insulating transformer 18 suppresses the flow of unidirectional current through the supply circuit connected to the terminals 17b, while the choke 14 suppresses the flow of alternating current through the source 12.

In Fig. 4 there is represented a simplified form of the system of Fig. 3 in which the motor is of the single-phase type utilizing a phase-splitting condenser as in the system of Fig. 2. However, in the circuit of Fig. 4 the tube 20' comprises a self-rectifying control device so that it effectively constitutes a unidirectionally controllable impedance across the winding 10b to control the unidirectional component of current therein. The principles of operation of the system of Fig. 4 are similar to those of the system of Fig. 3, described above. The circuit of Fig. 4 has the advantage that the energy-dissipating resistor 19 and the choke coil 14 may be eliminated.

In Fig. 5 there is represented a motor control system embodying the invention and including means responsive to an electrical characteristic of the motor excitation, such as the current to, or the voltage across, the motor windings for controlling the auxiliary magnetic field. In the system of Fig. 5 there is represented a three-phase hysteresis motor 24 having the three-phase windings 24a, 24b, and 24c connected to the three-phase supply circuit terminals 25 through a disconnect switch 26 of any conventional well-known type. The system is also provided with a control circuit including a source of unidirectional current, such as the battery 12, for applying to at least a portion of the winding system of the motor, for example, the winding 24b, a current effective to develop a subsynchronous magnetic field, as described above.

The system of Fig. 5 also includes relay means responsive to interruption of excitation of the motor, either voltage or current, for closing the control circuit for activating the field-applying means. For example, the relay means may be a current relay 27 having a winding 27a included in series in one of the supply circuit connections, a core 27b, and an armature 27c carrying the movable one of a pair of contacts 27d. The armature 27c is biased into circuit closing position by means of a spring 27e.

In the operation of the system of Fig. 5, when current is supplied to the motor so that it is operating normally, the winding 27a of relay 27 is energized to hold open the contacts 27d and the motor 24 operates as a conventional synchronous hysteresis motor. Upon failure of the excitation of the motor 24, as by failure of the power supply at the terminals 25, the relay 27 becomes deenergized to close its contacts 27d and apply a unidirectional current to the winding 24b from the battery 12 of a value sufficient to brake the motor rapidly to a stop.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A motor control system comprising: a synchronous hysteresis motor having a plurality of phase windings and a hysteresis rotor, a circuit for normally exciting said windings to develop a rotating magnetic field, a control circuit for applying to at least one of said phase windings a current effective to develop a sub-synchronous magnetic field of a value to reduce the speed of the motor below synchronism, and impedance means for substantially suppressing the flow of current in each of said circuits of the frequency of the other of said circuits.

2. A motor control system comprising: a synchronous hysteresis motor having a plurality of phase windings and a hysteresis rotor, a single-phase supply circuit including a phase-splitting condenser for normally exciting said windings to develop a rotating magnetic field, a control circuit for applying to one of said windings a unidirectional current effective to develop a stationary magnetic field of a value to reduce the speed of the motor below synchronism, said condenser serving to suppress the flow of unidirectional current in said supply circuit and a choke coil for suppressing the flow of current from said supply circuit in said control circuit.

HERBERT C. ROTERS.

REFERENCES CITED

The following references are of record in the file of this patent:

UNITED STATES PATENTS

| Number | Name | Date |
|---|---|---|
| 2,193,642 | Parvin | Mar. 12, 1940 |
| 2,196,402 | Snyder | Apr. 9, 1940 |
| 2,209,364 | Sweeny | July 30, 1940 |
| 2,328,743 | Roters | Sept. 7, 1943 |